C. C. HOWENSTINE.
LIGHT METER.
APPLICATION FILED SEPT. 6, 1919.
1,361,999.
Patented Dec. 14, 1920.
2 SHEETS—SHEET 1.
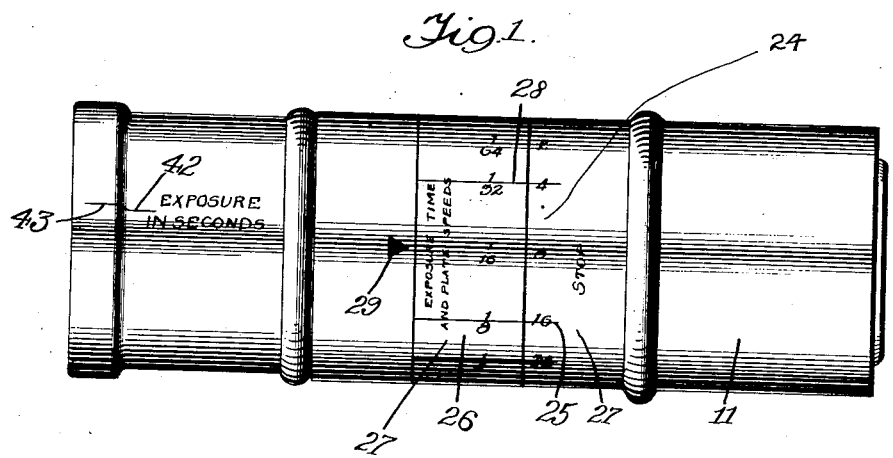
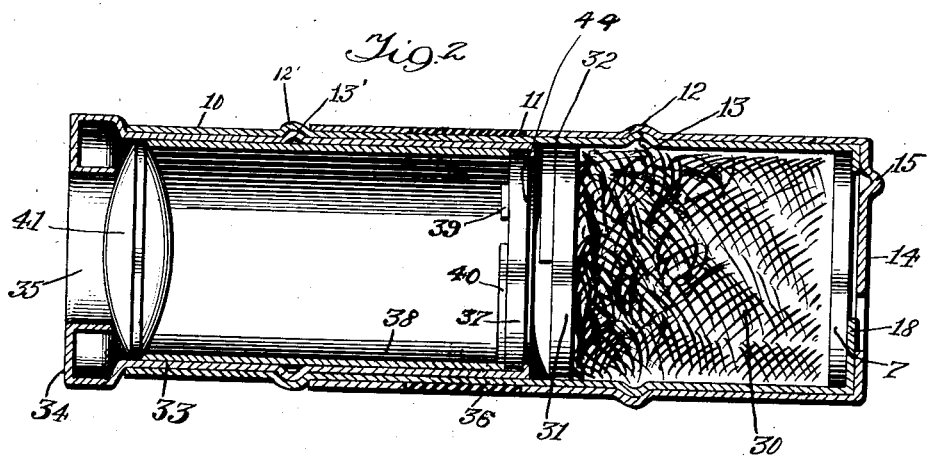
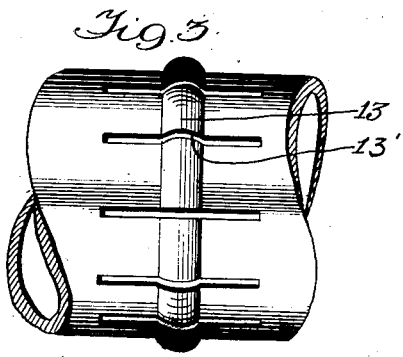
WITNESSES
George C. Myers
INVENTOR
C. C. HOWENSTINE,
BY
ATTORNEYS C. C. HOWENSTINE.
LIGHT METER.
APPLICATION FILED SEPT. 6, 1919.
1,361,999.
Patented Dec. 14, 1920.
2 SHEETS—SHEET 2.
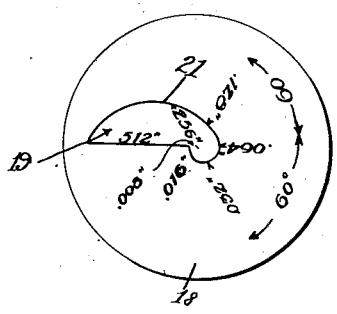
Fig.4.
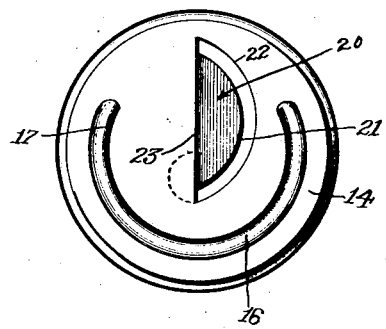
Fig.5.
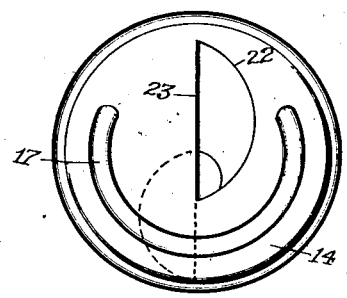
Fig. 6.
Fig.9.
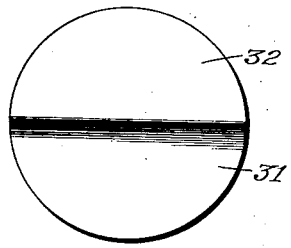
Fig.7.
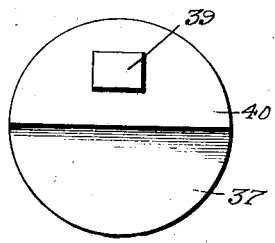
Fig.8.
WITNESSES
George C. Myers.
INVENTOR
C. C. HOWENSTINE,
BY
ATTORNEYS

UNITED STATES PATENT OFFICE.

CHARLES CLINTON HOWENSTINE, OF HIGHLAND PARK, MICHIGAN.

LIGHT-METER.

1,361,999.  Specification of Letters Patent.  Patented Dec. 14, 1920.

Application filed September 6, 1919. Serial No. 322,077.

*To all whom it may concern:*

Be it known that I, CHARLES C. HOWENSTINE, a citizen of the United States, residing at Highland Park, in the county of Wayne and State of Michigan, have invented new and useful Improvements in Light-Meters, of which the following is a specification.

My invention relates to a meter for determining the strength of light, and is particularly useful in taking photographs, to give the correct exposure for any diaphragm opening and any speed of plate or film, while not necessarily restricted to this use, as the same may be employed in measuring the distribution of light in public buildings, stores, streets, etc.

In accordance with my invention I provide means to measure the intensity of the light coming from the subject. In my improved light meter, I employ a self-luminous body or compound, as a standard, with which to compare the strength of the light coming from the subject. This is accomplished by admitting such a proportion of the incident light, in proximity to the self-luminous body, as will exactly match the light from the said self-luminous body, the means for controlling the admittance of the light in proximity to the self-luminous body, coacting with a suitable means or scale, for indicating the correct exposure for any stop or speed of plate, film, etc.

An important advantage of my meter is that it measures the light coming from the subject, which is the same light that makes the picture, and a further advantage is that the meter will operate as well, if not better, in weak interior light as in strong light, and is therefore useful where the ordinary light meters fail.

In the accompanying drawings forming a part of this specification and in which like numerals are employed to designate like parts throughout the same, Figure 1 is a side elevation of a meter embodying my invention, Fig. 2 is a central longitudinal sectional view through the same, Fig. 3 is a side elevation of a resilient flange or rib, Fig. 4 is an end elevation of an inner relatively stationary casing, with the outer rotatable casing removed, Fig. 5 is an end elevation of the outer rotatable casing or of the complete meter, showing the shutter opening completely uncovered, Fig. 6 is a similar view showing this opening reduced to the smallest size, Fig. 7 is a side elevation of a color screen or film and associated elements, Fig. 8 is a similar view of a second film or screen which carries the self-luminous body, Fig. 9 is a detail view, partly diagrammatic, of the scales.

In the drawings wherein for the purpose of illustration is shown a preferred embodiment of my invention, the numeral 10 designates a relatively stationary cylindrical casing, which may be considered as the body portion of the device. This casing is preferably formed of resilient sheet metal. An outer casing 11 is pivotally mounted upon the inner casing 10, and is provided with an outwardly bulging hollow flange 12, for the reception of an inner outwardly bulging flange 13. These flanges prevent the telescoping sleeves from moving longitudinally with relation to each other, but permit of the turning movement of one sleeve with relation to the other. As shown in Fig. 3, the inner flange 13 is slotted at 13', which renders it resilient, so that it will flatten out when the outer sleeve 11 is being slipped upon the inner sleeve 10, this flange 13 springing into the flange 12, when the two flanges register.

At its forward end, the casing 11 is provided with a head or end 14, having an outwardly bulging curved flange 16, for the reception of an outwardly bulging lug 18', formed upon the head or end 18 of the inner casing 10. The function of this coacting flange and lug is to limit the turning movement of the outer casing with respect to the inner casing, through an extent of travel of 180°.

As more clearly shown in Fig. 4, the head 18 is provided with a shutter opening 19. The specific shape of the shutter opening 19 is clearly shown in Fig. 4, and this opening is preferably formed of one turn of a logarithmic spiral and the radius vector connecting the beginning and end of the turn. This curve has an equation of the form $r = a\theta$, where $r$ = radius vector $\theta$ = vectorial angle and $a = a$ constant. It has the property that the area of the segment cut off by a chord passing through the center, increases in geometrical progression as the chord is uniformly revolved. In the particular curve shown in Fig. 4, the radius vector doubles every 60°, and the area doubles every 30°.

The end 14 is provided with a coacting shutter opening 20, which is substantially larger than the opening 19, so that the curved side of the opening 19, designated 21, may be arranged wholly inwardly of the curved side 22. The opening 20 has a straight side or edge 23. This straight edge 23, coacting with the curved edge 21, defines the extent of the uncovered portion 19, which may be adjusted by turning the outer sleeve 11 with respect to the inner sleeve 10. Fig. 5, shows the shutter opening 19 completely open or uncovered, while Fig. 6 shows the opening 19 covered to the fullest extent. The opening 19 is fully uncovered, by turning the outer casing 11 through 180°, from the maximum closed position. It therefore follows that the shutter area and the light admitted are doubled by turning the outer casing 11 through an angle of 30°.

The numeral 24 designates a "stop" scale, formed upon the outer casing 11, and divided by lines 25 into 30° spaces, which lines are numbered to indicate the stop numbers.

Since the stops in both the U or uniform system and F or focal system are so numbered that the numbers increase in geometrical progression, by dividing the scale 24 into the 30° spaces and marking the spaces with the stop numbers so that each succeeding number represents a stop opening in the camera of twice the area of the preceding one, the proper exposure can be read directly on a relatively stationary scale 26, for any stop opening and any state or condition of light. The scale 26 is formed upon a ring 27, pivoted upon the inner casing 10. The scale 26 is graduated by lines 28, arranged 30° apart and these lines are designated by numbers or fractions, indicating the time of exposure. This time of exposure doubles for every 30°. The graduations on the scale 26 also indicate the speed of the plate or film, and the meter is set for different plate speeds by turning the ring 27 until the number indicating the selected plate speed is brought opposite a fixed mark 29.

The stationary casing 10 has its forward portion filled with a mass of light diffusing material 30, which may be paraffin, opal glass, or the like, to distribute the light in a uniform manner throughout the casing. The forward end of the material or mass 30 is spaced from the head 18, as clearly shown in Fig. 2.

The light passing through the uncovered portion of the shutter opening 19, passes through the diffusing body 30, and through a color screen 31, arranged within the casing 10, at the rear of the body 30 and held stationary therein by any suitable means. This color screen may be a gelatin film, stained a bluish green color, which transmits only the light of the same color as that given off by a luminous body, to be described, as it is much easier to match two lights of the same color. The color screen 31 has one-half of its area rendered more translucent by a covering 32, which is substantially semi-circular. This covering 32 may be formed of a suitable number of sheets of tissue paper, and is of such thickness that it will transmit only one-sixtieth of the incident light.

Arranged within the relatively stationary casing 10 is a rotatable inner casing 33, having its near end bent to form a flange 34, affording a vision opening 35. The forward end of the casing 33 has an inwardly extending flange 36, engaging a screen 37, which may be formed of ground white glass. The screen is held against an inner tube 38, and is stationary with relation to the tube 33, to turn therewith. The screen 37 carries a luminous body 39, secured centrally thereon at a point to one side of an opaque covering 40. The opaque covering 40 is approximately semi-circular and slightly overlaps the screen or covering 32, as shown. The luminous body 39 is preferably a mixture of radium and phosphorescent zinc sulfid, which is similar to the compound used for making the dials of watches luminous at night. The light passing through the covering 32 and through the screen 37, upon one side of the covering 40, and surrounds the luminous body 39.

A convex lens 41 is arranged inwardly of and at the opening 35, which is employed to bring the screen 37 within the distance of distinct vision without unduly increasing the length of the instrument.

The rear end of the intermediate casing 10 is marked "Exposure in seconds" and is provided with a line 42, to be brought into registration with a line 43 upon the flange 34. When this registration occurs the inner sleeve 33 is turned so that the luminous body 39 is opposite the covered area 32 of the screen 31. When in this position it is used for measuring intense or bright lights, and the exposure is read in seconds. By rotating the inner casing 33 for 180° with respect to the intermediate casing 10, the luminous body 39 is brought opposite the uncovered portion of the screen 31, while the opaque covering 40 covers the covering 32. The light passing through the uncovered portion of the screen 31 will be sixty times as strong, for the same extent of the shutter opening, as if this light past through the cover 32. In this adjustment, the instrument is used for interior work and for weak light, and the exposure is read in minutes. The casing 10 is provided diametrically the line 42 with a line 42', marked "Exposure in minutes," which is now in registration with the line 43. This adjustment for strong and weak light greatly increases the range of operation of the instrument.

As the luminous body 39 is sensitive to ordinary light, I prefer to place an opaque film 44, such as a section of tin foil, rearwardly of the body 39, between it and the film or screen 31, to prevent the light passing through the shutter opening, reaching the luminous body.

The casings 10 and 33 are held together by flanges 12' and 13', similar to flanges 12 and 13.

The operation of the apparatus is as follows:

If the device is used for determining the strength of bright light, the line 42 will register with the line 43, so that the luminous body 39 will be opposite the covering 32. The eye is then placed at the opening 35, and the outer sleeve 11 is turned to regulate the size of the shutter opening, and the volume of light passing into the device from the subject, until the light passing through the uncovered portion of the screen 31 is the same or matches the light from the body 39.

It is to be understood that the form of my invention herewith shown and described is to be taken as a preferred example of the same, and that various changes in the shape, size, and arrangement of parts may be resorted to without departing from the spirit of my invention, or the scope of the subjoined claims.

Having thus described my invention, I claim:—

1. A device of the character described comprising a casing, a screen rotatably mounted within the casing, a luminous body carried by the screen and surrounded by portions thereof, a second color screen arranged within the casing in advance of the first-named screen and having a portion thereof provided with a translucent covering, means to turn the rotatable screen and means to admit light passing from the subject into the casing.

2. A device of the character described comprising a casing, a screen rotatably mounted within the casing, means to cover a portion of the screen to make it opaque, a luminous body carried by the uncovered portion of the screen, means to turn the screen, a second color screen arranged within the casing in advance of the first-named screen and having a portion thereof provided with a translucent covering, and means to admit light passing from the subject into the casing.

3. A device of the character described, comprising a casing having a sight opening near one end, a screen arranged within the casing, means to cover a portion of the screen to render it opaque, a second color screen arranged within the casing in advance of the first named screen and having a portion thereof provided with a translucent covering, a luminous body carried by the uncovered portion of the first named screen, means to turn the first named screen with relation to the second named screen, and adjustable means to regulate the volume of light passing into the casing from the subject.

4. A device of the character described, comprising a casing, a screen arranged within the casing, means covering a portion of the screen to render it opaque, a luminous body carried by the uncovered portion of the screen, a color screen arranged in advance of the first named screen, a covering for a portion of the cover screen serving to render the same more translucent, means to turn the first named screen with relation to the second named screen, adjustable shutter means to regulate the passage of light into the casing, and calculating means coacting with the shutter means.

5. A device of the character described comprising a casing, a screen rotatably mounted within the casing, a luminous body carried by the screen and surrounded by portions thereof, a second color screen arranged within the casing in advance of the first-named screen and having a portion thereof provided with a translucent covering, a light diffusing mass arranged within the casing in advance of the screen, means to turn the rotatable screen, and means to admit light passing from the subject into the casing.

6. A device of the character described comprising a casing, a screen arranged within the casing, a luminous body carried by the screen and surrounded by portions thereof, a shutter associated with said casing having a shutter opening, the area of which may be varied in geometrical progression to control the light, means for indicating quantities varying in geometrical progression as functions of the area of the shutter opening, and means for operating said shutter and constraining said indicating means to move to position corresponding to the adjustment of said shutter opening.

CHARLES CLINTON HOWENSTINE.